(12) United States Patent
Aslandere et al.

(10) Patent No.: US 12,488,422 B2
(45) Date of Patent: Dec. 2, 2025

(54) CUSTOMIZATION OF VEHICLE-RELATED IMAGES

(71) Applicant: Ford Global Technologies, LLC, Dearborn, MI (US)

(72) Inventors: Turgay Isik Aslandere, Aachen/NRW (DE); Cem Mengi, Aachen/NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 374 days.

(21) Appl. No.: 18/159,159

(22) Filed: Jan. 25, 2023

(65) Prior Publication Data

US 2023/0252613 A1    Aug. 10, 2023

(30) Foreign Application Priority Data

Feb. 7, 2022  (EP) ..................................... 22155431

(51) Int. Cl.
| | | |
|---|---|---|
| *G06T 5/50* | (2006.01) | |
| *B60R 1/26* | (2022.01) | |
| *G06N 3/0475* | (2023.01) | |

(52) U.S. Cl.
CPC ................. *G06T 5/50* (2013.01); *B60R 1/26* (2022.01); *G06N 3/0475* (2023.01); *B60R 2300/30* (2013.01); *G06T 2207/20081* (2013.01); *G06T 2207/20084* (2013.01); *G06T 2207/30252* (2013.01)

(58) Field of Classification Search
None
See application file for complete search history.

(56) References Cited

U.S. PATENT DOCUMENTS

| | | |
|---|---|---|
| 11,017,506 B2 | 5/2021 | Mayol Cuevas et al. |
| 11,042,758 B2 | 6/2021 | Jaipuria et al. |

(Continued)

FOREIGN PATENT DOCUMENTS

| | | |
|---|---|---|
| CN | 109461131 A | 3/2019 |
| CN | 111409555 A | 7/2020 |
| DE | 102019133603 A1 | 6/2021 |

OTHER PUBLICATIONS

EP Search Report dated Aug. 5, 2022.

(Continued)

*Primary Examiner* — Leon Viet Q Nguyen
(74) *Attorney, Agent, or Firm* — Christopher Storms; Brooks Kushman P.C.

(57) ABSTRACT

A method for a driver assistant image customization of vehicle-related images, a data processing circuit, a computer program, a computer-readable medium, and a vehicle, can include, with at least one sensing device of the vehicle, obtaining an input image to be customized. With at least one human-machine-interface of the vehicle or connected thereto an input determining at least one customization scheme to be performed is received. Using at least one data processing circuit of the vehicle applying artificial intelligence the input image is transformed according to the at least one customization scheme into a transformed output image. With at least one smart mirror of the vehicle or a mobile device connected to the at least one data processing circuit the transformed output image is outputted. The at least one customization scheme includes a plurality of different types of adaptation modes.

20 Claims, 7 Drawing Sheets

(56) References Cited

U.S. PATENT DOCUMENTS

| | | | |
|---|---|---|---|
| 11,250,329 B2* | 2/2022 | Karras | G06N 3/047 |
| 2018/0126903 A1* | 5/2018 | Herrmann | H04N 25/615 |
| 2021/0004608 A1* | 1/2021 | Jaipuria | G06T 15/06 |
| 2022/0377257 A1* | 11/2022 | Wilson | G06N 3/08 |
| 2022/0405530 A1* | 12/2022 | Metwaly | G06V 10/60 |
| 2023/0360182 A1* | 11/2023 | Fanello | G06T 5/92 |

OTHER PUBLICATIONS

Zhu et al., "Unpaired Image-to-Image Translation using Cycle-Consistent Adversarial Networks", arXiv:1703.10593v7 [cs.CV] Aug. 24, 2020.
LeCun et al., "Deep learning", 436 | Nature | vol. 521 | May 28, 2015; doi: 10.1038/nature14539.

* cited by examiner

CUSTOMIZATION OF VEHICLE-RELATED IMAGES

RELATED APPLICATION

This patent application claims priority to European Application No. EP 22155431.4 filed on Feb. 7, 2022, which is hereby incorporated by reference in its entirety.

BACKGROUND

In recent vehicles so called "smart mirrors" can be used. Smart mirrors can provide a connected camera view. For example, a rear camera of the vehicle may obtain rearward images in special driving situations. These images may then be displayed at a display of the "smart mirror." In other words, a "smart mirror" can act as a digital mirror replacing an existing glass mirror.

CN109461131A discloses a rearview mirror showing a rearview of a surrounding of the vehicle. An image control unit is used to process images from a rearview camera in order to adjust parameters such as image distortion and screen brightness. A convolutional neural network is trained based on training images to achieve a deblurring model which is applied to the images obtained by the rearview camera during use to serve "bad weather" conditions.

CN111409555A also discloses a rearview mirror. A digital signal processor of a quality conversion unit processes "low quality" rearview images of a surrounding of the vehicle obtained by a camera to achieve images of improved quality if a quality screening unit judges that the image resolution and the signal-to-noise ratio of the obtained image are below a threshold. The quality screening unit applies a deep learning generative adversarial network in this regard. Training of the generative adversarial network is performed based on "high quality" and "low quality" images thereby adjusting the generator of the generative adversarial network.

U.S. Pat. No. 11,017,506B2 discloses a method for enhancing an image quality utilizing filters of a convolutional neural network being a component of a generative adversarial network (GAN). An image enhancement module includes at least one trained convolutional neural network to adapt an image quality based on at least a subset of an image on an object basis.

U.S. Pat. No. 11,042,758B2 discloses a variational auto encoder-GAN to generate a plurality of domain-adapted synthetic images in view of a base synthetic image obtained by means of a vehicle sensing device. The GAN is trained to adapt the base synthetic image from a first domain in view of a second different domain by adapting weather and brightness properties. Optionally, user inputs specifying the respective domain according to which domain the base synthetic image is to be adapted may be included in the process.

However, existing "smart mirrors" may be limited, e.g., with respect to customization of images and connectivity is limited as well. Also, training procedures to prepare the underlying neural networks for use are complex and inefficient.

SUMMARY

The present disclosure generally relates to a method for a driver assistant image customization of vehicle-related images, a data processing device, a computer program, a computer-readable medium, and a vehicle.

Some aspects of the present disclosure are presented with regard to methods, others with regard to respective devices. However, these aspect or features can be correspondingly to be applied to one another.

A summary of certain embodiments disclosed herein is set forth below. It should be understood that these aspects are presented merely to provide a brief summary of these embodiments and that these aspects are not intended to limit the scope of this disclosure. This disclosure may encompass a variety of aspects that may not be set forth below.

According to an aspect, a method for a driver assistant image customization of vehicle-related images is provided. The method comprises at least the steps of:

S1 obtaining, with at least one sensing device of the vehicle, an input image to be customized;

S2 receiving, with at least one human-machine-interface of the vehicle or connected thereto, an input determining at least one customization scheme to be performed, S3 transforming, using at least one data processing device of the vehicle applying artificial intelligence, the input image according to the at least one customization scheme into a transformed output image provided by the at least one data processing device; and S4 outputting, with at least one smart mirror of the vehicle or a mobile device connected to the at least one data processing device, the transformed output image.

The at least one customization scheme includes one or a plurality of different adaptation modes.

According to the present method the user may specify which specific customization scheme is to be utilized for personalizing the input image. Hence, the range of available customization is greatly enhanced compared to existing methods. Thus, the user is enabled to make use of the vehicle as desired. Also, in view of the chosen customization scheme, the present method allows the transformation process to be adapted accordingly. For example, a user may specify a first available adaptation modes to be performed. Then, the transformation process directly reflects the chosen adaptation mode. Subsequently, the same or a different user may specify a different adaptation mode to be performed. In this case, the transformation process is modified accordingly. Hence, the present method provides an approach to strengthen the relationship between the user and his vehicle while the transformation process is adapted as desired.

Within the present context customization may be considered to describe a modification of a specific property for display of an image according to the user's requests.

Within the present context, a human-machine-interface may be considered a device which allows an interaction of at least one data processing device with a user. The human-machine-interface may be a one-way, two-way, or multiple-way interface. Thus, in a first configuration user inputs may be received only, while in other configurations, output data or information, such as output images, may also be outputted at the human-machine-interface.

Within the present context, a customization scheme may be considered to reflect a configuration specified by the user according to which the input image is to be customized. The configuration may define certain properties which are expected by the user to appear or to be included (embedded or overlaid) within the transformed output image. The customization scheme may comprise a single or multiple different aspects which the user is expected to appear or to be included within the transformed output image.

Within the present context, an adaptation mode may be considered a an image configuration, i.e., a configuration or specification of image pixels, wherein the transformed output image is expected to appear according to the adaptation mode. As an example, a first adaptation mode may be considered a black/white mode. Consequently, the user expects the transformed output image to show black and white colors only. Another example comprises a second adaptation mode which may be grayscale image. Therefore, the second adaptation mode may be considered to reflect a configuration according to which the transformed output image is shown with grayscale colors.

In view of the adaptation modes, a specific customization scheme may also comprise a combination of different adaptation modes combined in a single configuration. In other words, the customization scheme determines the specific combination or configuration of adaptation modes which the transformed output image is expected to include.

Within the present context, artificial intelligence may describe a software- or hardware-based process of imitating intelligent behavior. For example, artificial intelligence may include optimization and machine learning. Therefore, the at least one data processing device may be configured to execute artificial intelligence processes. The at least one data processing device may also comprise additional hardware components to employ machine learning algorithms in real time. In other words, a computer program (software) or hardware-based system may comprise instructions such that intelligent behaviour is imitated. Based on the artificial intelligence, the input image is transformed and a transformed output image is provided. Generally, artificial intelligence may be implemented using at least one deep neural network.

A deep neural network consists of a large number of connected neurons organized in layers. Deep neural networks allow features to be learned automatically from training examples. In this regard, a neural network is considered to be "deep" if it has an input and output layer and at least one hidden middle layer. Each node is calculated from the weighted inputs from multiple nodes in the previous layer. Put differently, during learning, the algorithm follows a randomly initialized policy describing the mechanism of the deep neural network. The weights of all neurons may be considered to represent a specific mapping policy from an input state (here the input image) to an output state (here the transformed output image in view of the at least one customization scheme) of the neural network.

Within the present context, a smart mirror may be considered an embedded system located in the vehicle or coupled thereto. The smart mirror may replace the actual mirrors. For example, the inner rearview mirror or the side mirrors, which conventionally comprise glass-based reflectors, may be replaced by smart mirrors. Generally, the smart mirror may comprise a display or a different device to show the transformed output image, such as a projecting device.

The at least one data processing device may be coupled to or include a communication device which is able to communicate with mobile devices connected thereto.

Optionally, the plurality of different adaptation modes includes at least one of a sharpness adaptation mode, a brightness adaptation mode, a weather-type adaptation mode, a portrait adaptation mode, a comic adaptation mode, and a color adaptation mode.

Within the present context, the sharpness adaptation mode may be considered an adjustment of the sharpness of objects included within the input image. For example, the objects may be shown having blurred contours. The sharpness adaptation mode may then be selected such that the blurred contours are turned into sharp contours better reflecting real-world object contours. Consequently, an object may then be easier identifiable within the transformed output image.

Within the present context, the brightness adaptation mode may be considered an adjustment of the brightness within the transformed output image relative to the input image. For example, the input image may show a scenery acquired at night-time and, therefore, may comprise comparatively dark portions. By choosing the brightness adaptation mode, the transformed output image may then instead show a daytime scene including comparatively bright colors. Therefore, aspects of the image may be more recognizable by the user.

The weather-type adaptation mode may be considered an adjustment mechanism with regard to specific weather-related artifacts, such as rain drops, sleet, hail, snow-flakes, and/or fog. The weather-type adaptation mode may be configured to remove these artifacts from the input image. Sunny day scenery may be instead shown within the transformed output image. Hence, the transformed output image may show greatly reduced irregularities within the displayed scenery.

The portrait adaptation mode may represent an adjustment with regard to the general layout of the scenery included within the input image. The scenery may be adjusted such that instead a portrait-like image is shown within the transformed output image.

The comic adaptation mode may be considered a transformation according to which the real-world scenery included within the input image is transformed to be shown having a comic-like scenery within the transformed output image. The user may for example choose the comic adaptation mode if children are present. Thus, the entertainment character of the transformed output image may be enhanced.

The color adaptation mode may be considered a specific color scheme to be used when transforming the input image into the transformed output image. For example, if a user has a red-green color weakness, the colors may be adjusted accordingly. Within the transformed output image the simultaneous inclusion of green and red color tones may then be omitted.

Generally, all adaptation modes can include a variety of sub-modes. For example, the color adaptation mode may comprise a black/white mode as well as a red-green color weakness mode. Also, the brightness adaptation mode may comprise different modes each resulting in different brightness levels within the transformed output image.

A specific customization scheme may then comprise a single adaptation mode or a combination of multiple adaptation modes which are to be considered when transforming the input image into the transformed output image.

Preferably, the at least one data processing device comprises a plurality of generative adversarial networks (GANs). At least one GAN of the plurality of GANs is assigned to each of the plurality of different adaptation modes.

Within the present context, a GAN may be considered an algorithmic software-based or hardware-based architecture that uses at least two neural networks. The neural networks are pitted against one another to generate new, synthetic instances of data. During the training phase the underlying mapping policies of the neural networks are adapted until the synthetic data can pass for real data.

Since the different adaptation modes require specific modifications of the transformation processes to be considered, a single GAN is assigned to each of the different adaptation modes. Accordingly, the required modification of the transformation process of the input image into the transformed output image is precisely adjusted in view of the adaptation modes included within the specific customization scheme received from the human-machine-interface. Hence, the image-to-image translation is improved according to known methods where only a single GAN is provided to serve all different types of image-to-image transformations.

Optionally, the at least one data processing device is coupled to a server device. Each GAN may comprise at least two neural networks. Then, the at least one data processing device may receive at least one operating mapping policy comprising weights of neurons included in at least one neural network of the at least one GAN to be applied from the server. In other words, the GANs included within the vehicle do not need to be trained on an individual basis using that vehicle. Rather, the respective operating mapping policy describing the weights of the neurons included within the neural networks to be used during a use phase of the GAN may be received from a centralized instance on the server, for example. Accordingly, training of the GANs of the respective vehicle may be omitted.

The operating mapping policy can be determined based on at least the following steps:

S0-1 providing, as an input to a generator of the respective GAN, at least one training image, wherein the generator comprises a first neural network;

S0-2 generating, using the generator, as an output at least one fake image associated to the at least one training image based on a generator mapping policy assigned to the generator;

S0-3 providing, as an input to a discriminator of the respective GAN, the at least one training image and the at least one fake image associated thereto, wherein the discriminator comprises a second neural network; and S0-4 determining, using the discriminator, as an output a confidence level matrix in view of the at least one training image and the at least one fake image associated thereto, wherein the confidence level matrix determines whether a respective image of the at least one training image and the at least one fake image is considered authentic.

The generator mapping policy is adjusted in view of individual weight levels included therein upon repetitions of the steps S0-1 to S0-4 at least until the confidence level matrix comprises (individual) confidence levels being equal to or exceeding a confidence level threshold. The at least one operating mapping policy at least includes the so-adjusted generator mapping policy.

The operating mapping policy may be considered to represent the results of the training phase of the respective GAN. In particular, the operating mapping policy determines the weights of neurons included within neural networks of the respective GAN for use after training.

The training phase can be considered to represent a phase during which the weight of the neurons of the underlying neural networks are adjusted such that the generator generates more realistic synthetic data instances, and such that for the discriminator, from cycle to cycle, it is more challenging to decide which data instance (original input data or fake data) is authentic.

In more detail, in view of an input image, the generator, using the first neural network of the GAN, generates new synthetic data instances. The discriminator of the GAN comprises a second neural network. The discriminator evaluates the original data and the new synthetic data instances for authenticity. In other words, the discriminator decides which instance of the original data and the new synthetic data it considers to be authentic. Based on the decision process of the discriminator, the generator mapping policy is adapted between subsequent cycles. Then, within a subsequent cycle, the generator may potentially create new, synthetic images that are more challenging for the discriminator to evaluate because the adjusted generator mapping policy enables the generator to generate even more realistic fake images.

For example, during the first cycle, the synthetic image generated by the generator may be of relatively bad quality. Therefore, the confidence level matrix determined by the discriminator may specify that the input image is believed to be authentic at a 90% probability and a synthetic image (generated by the generator) is believed to be authentic at a 10% probability. As a consequence, the weights of the neurons included within the generator mapping policy may be adjusted for the subsequent step. During a subsequent cycle, the synthetic image may be more realistic resulting in modified confidence levels of 80% vs. 20% probabilities. Over a number of repetitions this process may be used to adjust the generator mapping policy until the discriminator determines confidence levels which are equal to or above a certain threshold. For example, if the discriminator determines both data instances (original data and fake data) at 50% probability both to be authentic, this may mean that the discriminator is no longer capable of distinguishing between authentic and fake images. This corresponds to the generator being able to generate synthetic images which are so realistic that they are not distinguishable from the actual original image anymore. Hence, the generator is optimized to create most realistic images, i.e., images that the discriminator cannot easily identify. This training procedure results in a generator mapping policy which is suitable for use phases, e.g., for use in a display such as a smart mirror. Therefore, if the confidence level determined by the discriminator is equal to or exceeds the confidence level threshold, the so-adjusted generator mapping policy is considered to represent at least a portion of the operating mapping policy provided by the server device to the respective GANs for use.

Within the present context, the confidence level threshold may not necessarily represent a single number. Rather, the confidence level threshold may also comprise different numbers according to threshold matrix comprising entries corresponding to the images to be evaluated by the discriminator. Moreover, the confidence level threshold may be different for different training procedures with regard to different GANs.

The server device also enables a distributed training procedure to be applied. In other words, training of the respective GANs can be performed simultaneously by multiple vehicles comprising data processing devices having the GANs. Therefore, the training phase is not performed on the basis of a single GAN but on the basis of multiple GANs included in different vehicles, e.g., within a "fleet" of vehicles. This may also be referred to as cloud training. Accordingly, more sophisticated results can be obtained in shorter times. Furthermore, the training may continuously be performed also during use of the respective GANs. This may result in even more sophisticated operating mapping policies distributed by the server device.

The GANs can be trained in an unsupervised manner using a collection of images from the source (input images) and target domain (transformed output images). The source and target domains do not need to be related in any way. For example, the GANs are used to convert night images to day images, rainy-day images to sunny-day images and blurry images to sharper images. The respective source and target domain images are accordingly collected.

Optionally, the at least one sensing device comprises at least one of a visual spectrum camera, a depth camera, an infrared camera, a stereo camera, and a light detection and ranging (LiDAR) device. These are typical devices used to sense a surrounding of the vehicle nowadays. The at least one sensing device can be located anywhere with regard to the vehicle which has the necessary view of the invisible points by the driver. In addition, the existing image sensors such as parking cameras, 360-degree cameras, and other driving assistance features cameras can be repurposed to capture images and may, hence, also be part of the at least one sensing device. Of course, the input image may also be obtained in view of multiple sensing devices. In this case, the data of the respective multiple sensing devices may be combined to establish a single input image.

The at least one human-machine-interface can comprise at least one of the smart mirror of the vehicle and/or a multimedia device of the vehicle and/or a mobile device connected to the at least one data processing device of the vehicle or connected to a server device coupled to the at least one data processing device of the vehicle. Therefore, multiple instances are provided for users to specify a particular customization scheme. For example, the vehicle may comprise a network communication standard, such as Wi-Fi®. Mobile devices of additional passengers of the vehicle may connect to that network communication standard and input specific customization schemes. Accordingly, the connectivity is greatly enhanced.

Alternatively or cumulatively, the at least one human-machine-interface may also be configured such that the user may turn off/on the image translation mode according to the present method.

In some embodiments, the at least one smart mirror of the vehicle has at least one display and comprises at least one of a multimedia device of the vehicle, a digital sunroof of the vehicle, and a mobile device connected to the at least one data processing device of the vehicle or connected to a server device coupled to the at least one data processing device of the vehicle. Consequently, the transformed output image may be displayed at several different instances. Therefore, the customization is further enhanced. The transformed output image may exemplarily be outputted at mobile devices, such as mobile phones or tablets including a comic adaptation mode for children located in the back of vehicle.

Optionally, multiple customization schemes are determined by one or multiple inputs at the at least one human-machine-interface. The input image may then be transformed according to the multiple customization schemes. For example, mobile devices may be used to output transformed output images according to a first customization scheme, such as a comic adaptation mode for children located in the back of a vehicle. In addition, the transformed output image may be outputted at a smart mirror being used as a rearview mirror according to a different customization scheme including a brightness adaptation mode and a weather-type adaptation mode for the driver. In other words, customization is provided according to the respective needs of the passengers of the vehicle.

The adaptation modes can further include a device status adaptation mode. The at least one smart mirror may then be coupled to at least one control device of the vehicle and adapted to receive controller area network (CAN) data thereof. The at least one smart mirror may be configured to comprise device status information embedded or overlaid with the outputted transformed output image if at least the device status adaptation mode is included in the at least one customization scheme received at the at least one human-machine-interface. The device status information may be based on the received CAN data. The control device of the vehicle may be considered a central control unit controlling electric and electronic auxiliary devices of the vehicle. The received CAN data may be directly included by the smart mirror. In this regard, the smart mirror may encompass a data processing device accordingly configured in this regard. Therefore, the transformed output image may be customized in another aspect, namely with regard to aspects of the status of the underlying vehicle. For example, in case a fuel or energy level is low, the transformed output image may also include an indication in this regard, such as a red edge portion. In other words, the transformed output image does need not only represent the input image from an aesthetical point of view but may also comprise specific portions describing additional information with regard to the status of the vehicle. Thus, the transformed output image better assists the driver during various situations.

In some embodiments, the adaptation modes also include a device status adaptation mode. The at least one data processing device may be coupled to at least one control device of the vehicle and adapted to receive CAN data thereof. The at least one data processing device may be configured to comprise device status information within the transformed output image if at least the device status adaptation mode is included in the at least one customization scheme received at the at least one human-machine-interface. The device status information may be based on the received CAN data. In other words, the CAN data do not need to be included by the smart mirror but can also be included by the data processing device itself. If the smart mirror overlays the transformed output image with specific features based on the CAN data, the data processing device may alternatively embed the specific features within the transformation process.

At least step S3 of the above-described method may be performed computer-implemented. Preferably, steps S0-1 to S0-4 are performed computer-implemented as well.

According to another aspect, a data processing device comprising means for carrying out at least step S3 of the above-described method is provided.

According to even a further aspect, a computer program is provided. The computer program comprises instructions which, when the program is executed by a computer, cause the computer to carry out at least step S3 of the above-described method.

According to yet even another aspect, a computer-readable medium comprising instructions which, when executed by a computer, cause the computer to carry out at least step S3 of the above-described method is provided.

According to still another aspect, a vehicle comprising at least one sensing device, at least one human-machine-interface of the vehicle or connected thereto, at least one data processing device applying artificial intelligence, and at least one smart mirror or mobile device connected to the at least one data processing device is provided. The at least one sensing device is configured to obtain an input image to be customized. The at least one human-machine-interface is configured to receive an input determining at least one customization scheme to be performed. The at least one customization scheme includes a plurality of different adaptation modes. The at least one data processing device is configured to transform the input image according to the at least one customization scheme into a transformed output image and to provide the transformed output image to a smart mirror or a mobile device. The smart mirror or mobile device is configured to output the transformed output image.

This so-design vehicle provides an improved degree of customization and, simultaneously, enhanced driver assistant features.

All features explained with regard to the various aspects can be combined individually or in (sub) combination with other aspects.

BRIEF SUMMARY OF THE DRAWINGS

The foregoing aspects and further advantages of the claimed subject matter will become more readily appreciated, as the same become better understood by reference to the following detailed description when taken in conjunction with the accompanying drawings. In the drawings:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown but are to be accorded the widest scope consistent with the principles and features disclosed herein.

All of the features disclosed hereinafter with respect to the example embodiments and/or the accompanying figures can alone or in any sub-combination be combined with features of the aspects of the present disclosure including features of preferred embodiments thereof, provided the resulting feature combination is reasonable to a person skilled in the art.

For the purposes of the present disclosure, the phrase "at least one of A, B, and C", for example, means (A), (B), (C), (A and B), (A and C), (B and C), or (A, B, and C), including all further possible permutations when greater than three elements are listed. In other words, the term "at least one of A and B" generally means "A and/or B", namely "A" alone, "B" alone or "A and B".

Figure 1:
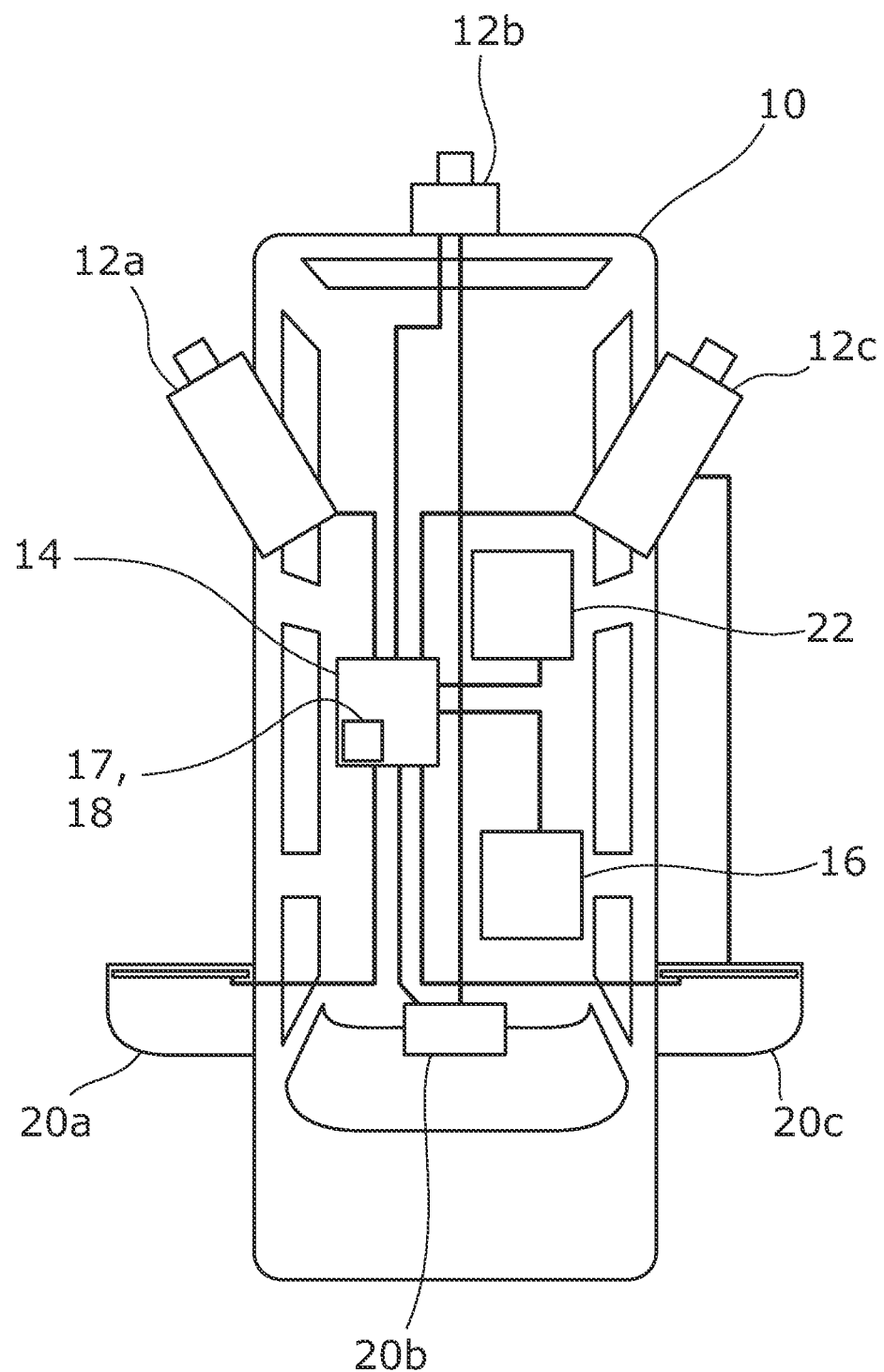
FIG. 1 is a schematic drawing of a vehicle.

FIG. 1 is a schematic drawing of a vehicle 10. According to this embodiment, the vehicle 10 comprises several sensing devices 12A to 12C. In particular, the vehicle 10 comprises a first, a second, and a third camera acquiring images with respect to dead angles relative to the driver of the vehicle 10.

The vehicle 10 also comprises a data processing device 14 coupled to the sensing devices 12A to 12C. The data processing device 14 applies artificial intelligence.

Moreover, the vehicle 10 comprises a human-machine-interface 16. For example, the human-machine-interface 16 may comprise a multimedia device of the vehicle 10. Via the human-machine-interface 16, a user may specify particular inputs to define desired customization schemes.

Optionally, the below described method may also be included in a computer program 17 stored on a computer-readable medium 18. The computer-readable medium 18 may be coupled to the data processing device 14. The program code may then be executed by the data processing device 14 included within the vehicle 10.

In addition, the vehicle 10 comprises a first, a second, and a third smart mirror 20A to 20C. The smart mirrors 20A to 20C are coupled to the data processing device 14 of the vehicle. The smart mirrors 20A to 20C each comprise a display which may be used to output images transformed by the data processing device 14.

Figure 2:
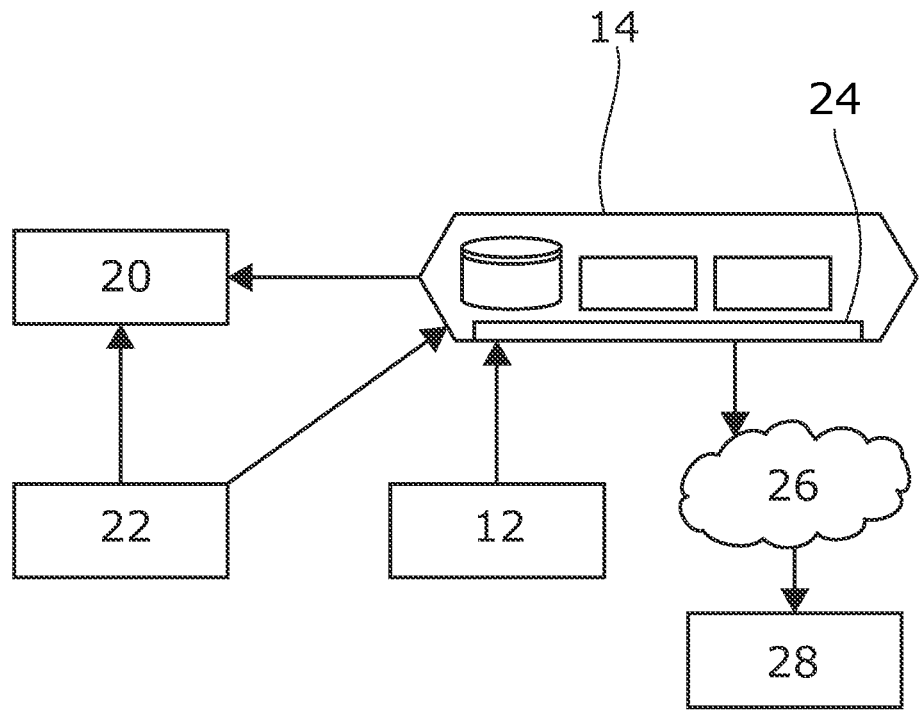
FIG. 2 is a schematic drawing of the hardware components.

FIG. 2 is a schematic drawing of the hardware components. According to this embodiment the vehicle 10 further comprises an additional electronic control unit (ECU) 22. The ECU 22 is configured to regulate and communicate with additional auxiliary devices of the vehicle 10, such as a fuel level meter and a velocity sensing device. The ECU 22 is also configured to provide CAN data determining specific properties of the vehicle 10, such as the current velocity, to the smart mirrors 20A to 20C. In different embodiments, the CAN data may also be provided from the ECU 22 to the data processing device 14.

As illustrated, images acquired by the sensing devices 12A to 12C are provided to the data processing device 14 as input images. Via the human-machine-interface 16, the data processing device 14 receives an input from an operator specifying a particular customization scheme according to which the input image is to be transformed using the artificial intelligence (AI) capabilities. Subsequent to the transformation, the transformed output images are provided from the data processing device 14 to the smart mirrors 20A to 20C where they are outputted and serve the driver for better control and customization of the vehicle 10.

According to this embodiment, the data processing device 14 also comprises a communication device 24. Via the communication device 24, the data processing device 14 may communicate with a server device 26. For example, such communication may be wireless using a mobile network and/or Wi-Fi standard. Therefore, the transformed output images may also be provided by the server device 26 to mobile devices 28 connected thereto. Accordingly, transformed output images may not only be displayed at the smart mirrors 20A to 20C but also at the mobile devices 28. Hence, additional passengers inside the vehicle 10, for example being located in the back of the vehicle 10, may view the transformed output images via their mobile phones or tablets.

Although not shown within this embodiment, the communication between the data processing device 14 and the mobile devices 28 may be bidirectional. This means, that the mobile devices 28 may also be used to specify customization schemes if particular inputs are made.

Figure 3:
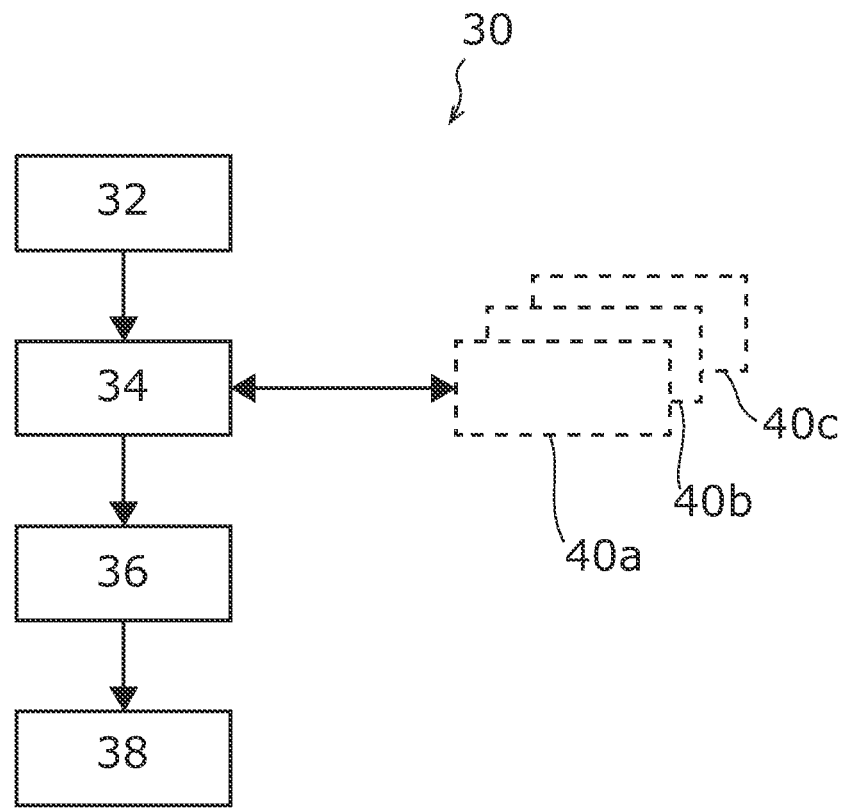
FIG. 3 is a schematic drawing of a method.

FIG. 3 is a schematic drawing of a method 30 for a driver assistant image customization of vehicle-related images. Optional aspects are shown with dashed lines.

In step 32, an input image to be customized is obtained with at least one sensing device 12 of the vehicle 10.

In step 34, an input determining at least one customization scheme to be performed is received with at least one human-machine-interface 16 of the vehicle 10 or connected thereto. The at least one customization scheme includes a plurality of different adaptation modes.

In step 36, the input image is transformed according to the at least one customization scheme into a transformed output image using at least one data processing device 14 of the vehicle 10 applying artificial intelligence. The transformed output image is provided by the at least one data processing device 14.

In step 38, the transformed output image is outputted with at least one smart mirror 20 of the vehicle 10 or a mobile device 28 connected to the at least one data processing device 14.

Optionally, the data processing device 14 may comprise multiple generated adversarial networks (GANs) 40A to 40C. In view of the multiple adaptation modes which may be included within the customization scheme, to each of the adaptation modes a separate GAN 40A to 40C is assigned. Since the different adaptation modes determine the type of transformation of the input image to be made, the transformation quality is improved if the transformation is adapted in view of the different adaptation modes. Since each GAN 40A to 40C comprises a separate generator, the use of a plurality of GANs 40A to 40C allows these generators to be adapted according to the different needs. For example, a generator of a first GAN 40A may be trained so that the input images are transformed to avoid weather artifacts within the transformed output image. In contrast, a generator of a different GAN 40B may be trained so that the input image is transformed into a comic-like aesthetic scenery within the transformed output image. Since these transformations require different transformation procedures, differently trained generators of different GANs 40A to 40C may better fit the respective needs of the various transformation processes compared to a single generator of a single GAN.

Figure 4:
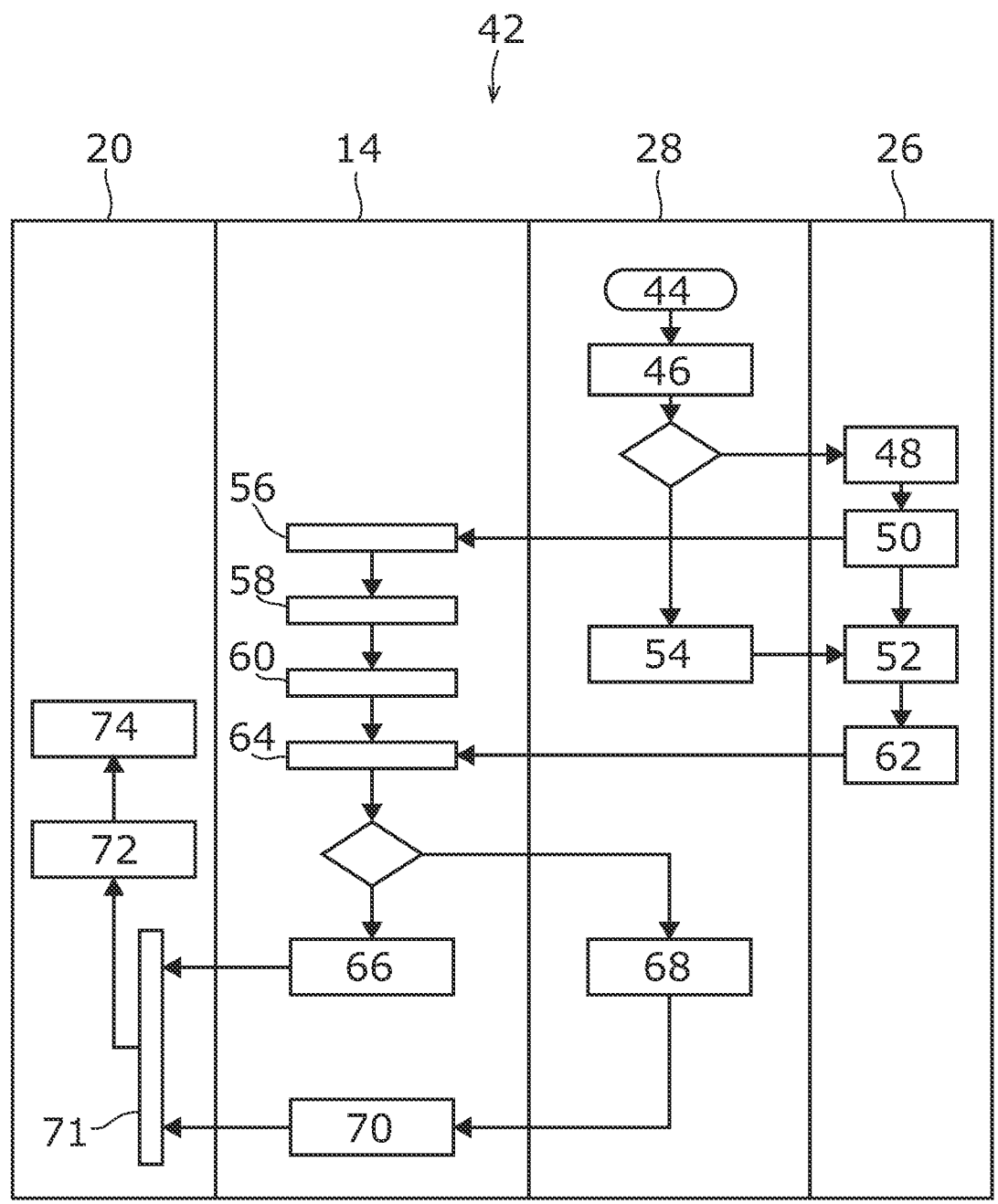
FIG. 4 is a schematic activity diagram of the system.

FIG. 4 is a schematic activity or process diagram 42 of the underlying system of the vehicle 10 according to an example.

Subsequent to start 44, a mobile device 28 checks at step 46 whether a trained neural network exists as part of the data processing device 14.

If no trained neural network being part of a generated adversarial network (GAN) of the data processing device 14 exists, at step 48, at least one (or multiple) GAN is trained under the supervision of the server device 26.

Once the training procedures completed, the server device 26 sends the results of the training procedure describing the weights of the neurons of the underlying neural networks of the GANs to the data processing device 14 at step 50.

At step 52 the training results are stored within a data storage device coupled to the server device 26 where the training results describe the weights of neurons to be used according to available adaptation modes of potentially usable customization schemes. In other words, training is performed in view of the GAN of a specific adaptation mode. The settings are stored at step 52 for those training procedures of those adaptation modes for which the training has been completed. If in view of the specific adaptation mode the training has not yet been finished, obviously the settings cannot be stored at step 52. Spoken differently, at step 52 the available range of adaptation modes is determined by those training results which are stored with the server device 26.

If a trained neural network being part of a GAN of the data processing device 14 exists, the mobile device 28 checks at step 54 whether specific settings with regard to the available configurations of the trained neural network are present. This means that at step 54 the mobile device 28 checks for the available customization schemes relying on the available range of adaptation modes. In this regard, the mobile device 28 may optionally receive the range of available customization schemes from the server device 26 at step 54.

Once the training procedure with regard to the neural networks of the GANs is completed or once respective trained parameters describing the weights of the neurons of the neural networks are known, the data processing device 14 receives these parameters from the server device 26 at step 56.

Furthermore, at step 58 the data processing device 14 receives input images collected by at least one sensing device 12.

Optionally, at step 60 the data processing device 14 also receives CAN data of an ECU 22 of the vehicle 10 describing properties of the vehicle 10.

At step 62, the server device 26 sends the settings with regard to the available configurations of the trained neural network describing the weights of the neurons of the new networks as well as the specified customization scheme to the data processing device 14. At step 64 the settings are enabled by the data processing device 14.

According to the present embodiment, at step 66, image transformation is enabled by the data processing device 14 based on the input image received at step 58 and the CAN data received at step 60. The image transformation at step 66 represents a case where no customization scheme is specified by a user. Although no customization scheme is inputted, the data processing device 14 may automatically transform the input image into the transformed output image and include (embed) specific information based on the CAN data.

Alternatively or additionally, the data processing device 14 communicates with the mobile device 28 to request specific customization schemes to be selected by a user at step 68 via user inputs performed at the mobile device 28.

If at step 68 such customization schemes including at least one or multiple adaptation modes are selected, the image transformation processes are accordingly adjusted at step 70 by the data processing device 14. Based on the adjusted image transformation processes using the respective settings of the GANs, transformed output images are generated also considering the specified customization scheme.

At step 72 at least one smart mirror 20 receives from the data processing device 14 transformed output images which have been generated in step 66 and/or step 70. In this regard, a selector 71 may be implemented which determines the transformed output image to be used. For example, if a particular customization scheme has been specified by the user in step 68, the transformed output image generated in step 70 may be selected. If a specific customization scheme has not been inputted by the user, the transformed output images generated in step 66 may be chosen instead.

Using a display device, the at least one smart mirror 20 outputs the received transformed output image at step 74.

It is to be understood that the activity diagram 42 is only exemplary and modifications may be performed by the skilled artisan. For example, the transformed output images may alternatively or in addition be outputted with the mobile device 28 as well. Also, the smart mirror 20 may also be capable of receiving user inputs to select customization schemes.

Figure 5:
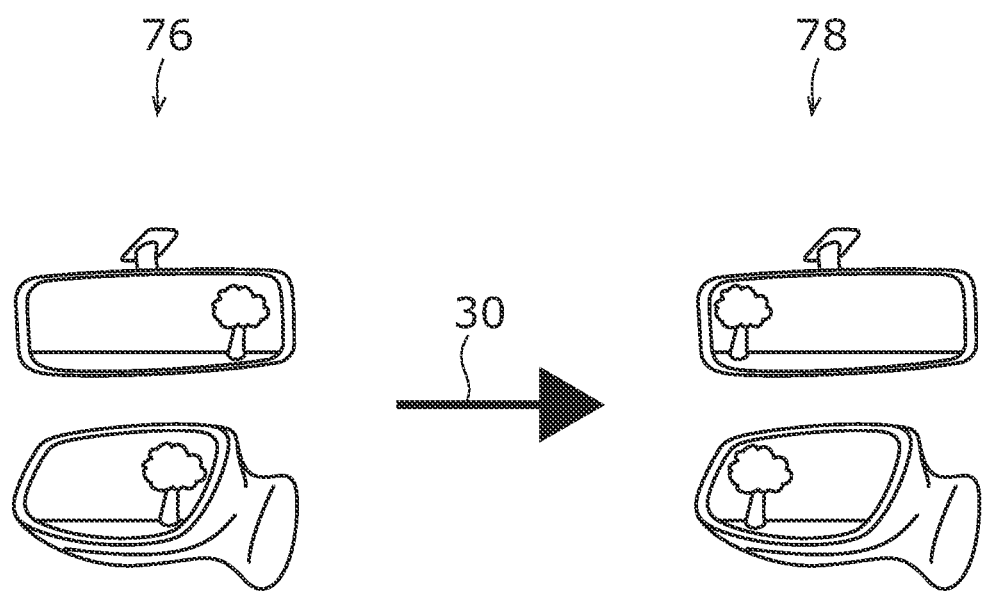
FIG. 5 is a schematic drawing of exemplary images before and after transformation.

The transformation process using the herein described method 30 may substantially affect the input image. FIG. 5 is a schematic drawing of exemplary images before and after transformation. The left images 76 represent exemplary images acquired by a sensing device 12 without any image transformation. In other words, if the present method 30 is not applied and the acquired images received from the at least one sensing device 12 are directly displayed at the smart mirror 20, such images 76 could potentially show a dark, cloudy, and blurred scenery.

In contrast, by applying the method 30 the image transformation may result in much clearer images. Here the right images 78 exemplarily represent images which have been transformed accordingly. The transformed images 78 on the right present a sunny scenery having improved sharpness and substantially omitting any weather-related artifacts. Therefore, the driver or user is provided with clearer images and is enabled to customize the vehicle 10 recording accordingly.

Figure 6:
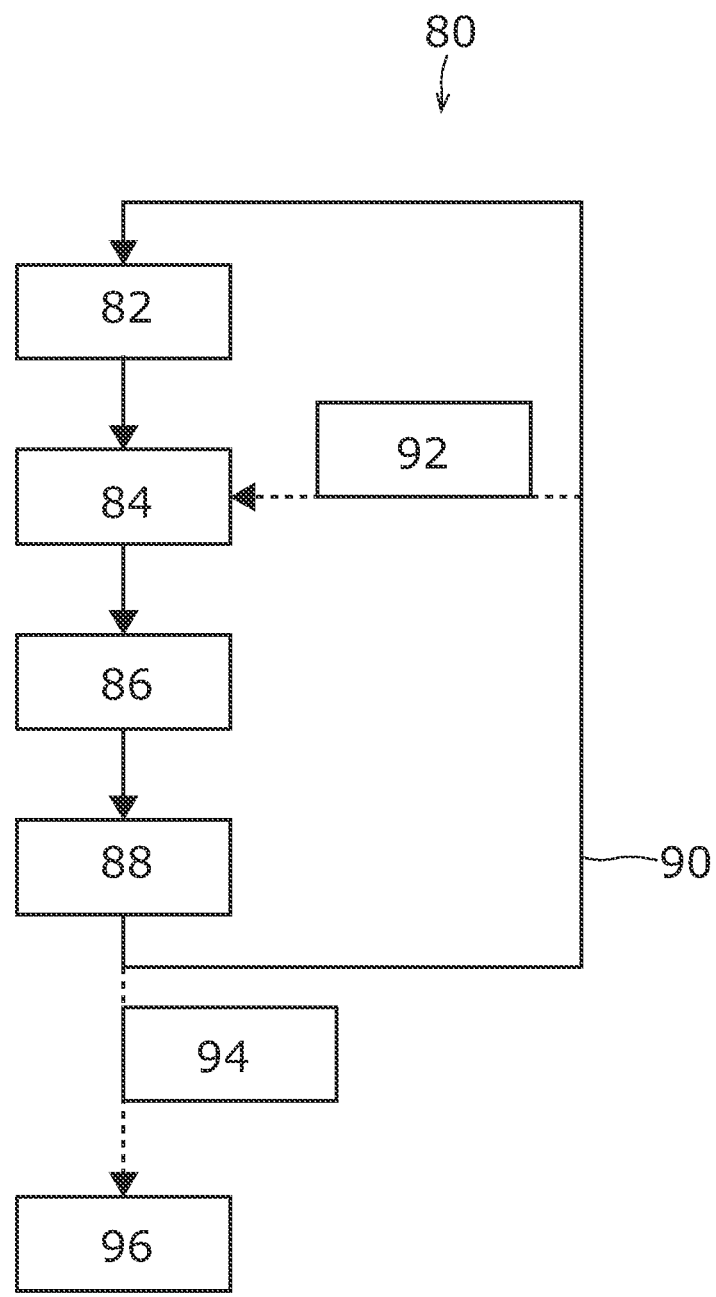
FIG. 6 is a schematic drawing of a training method of a GAN.

FIG. 6 is a schematic drawing of a training method 80 of a GAN. In view of each of the different adaptation modes, a separate GAN is trained and included within the data processing device 14. The GAN can be software- and/or hardware-based.

At step 82, at least one training image is provided as an input to a generator of the respective GAN. The generator comprises a first neural network of the GAN.

At step 84, at least one fake image associated to the at least one training image is generated using the generator based on a generator mapping policy assigned to the generator. The generator mapping policy describes the weights of the neurons of the underlying neural network of the generator during generating the at least one fake image.

At step 86, the at least one training image and the at least one fake image associated thereto are provided as an input to a discriminator of the respective GAN. The discriminator comprises a second neural network of the GAN.

At step 88, a confidence level matrix in view of the at least one training image and the at least one fake image associated thereto is determined using the discriminator. The confidence level matrix determines whether a respective image of the at least one training image and the at least one fake image is considered authentic.

Several repetitions 90 of the steps 82 to 88 are performed. Upon the repetitions 90, the generator mapping policy is adapted at step 92. This means that the generator mapping policy is adjusted at step 92 in view of individual weight levels included therein upon repetitions 90 at least until the confidence level matrix comprises individual confidence levels being equal to or exceeding a confidence level threshold. In other words, the generator mapping policy is adjusted so that the generator generates more realistic fake images being tougher to evaluate for authenticity in view of the original input image associated thereto. The goal is to adjust the generator such that the fake images may be considered authentic at equal probability compared to the original input (training) image. Then, the generator is optimized to generate realistic fake images.

Once the confidence level matrix comprises individual confidence levels being equal to or exceeding the confidence level threshold at step 94, an operating mapping policy is determined at step 96 including at least the so-adjusted generator mapping policy. This operating mapping policy may be considered to represent the parameters used in view of the respective GAN during use phases. The operating mapping policy comprising the trained parameters describing the weights of the neurons of the neural networks of the respective GAN is received by the data processing device 14 in step 56 of the activity diagram 42.

Figure 7:
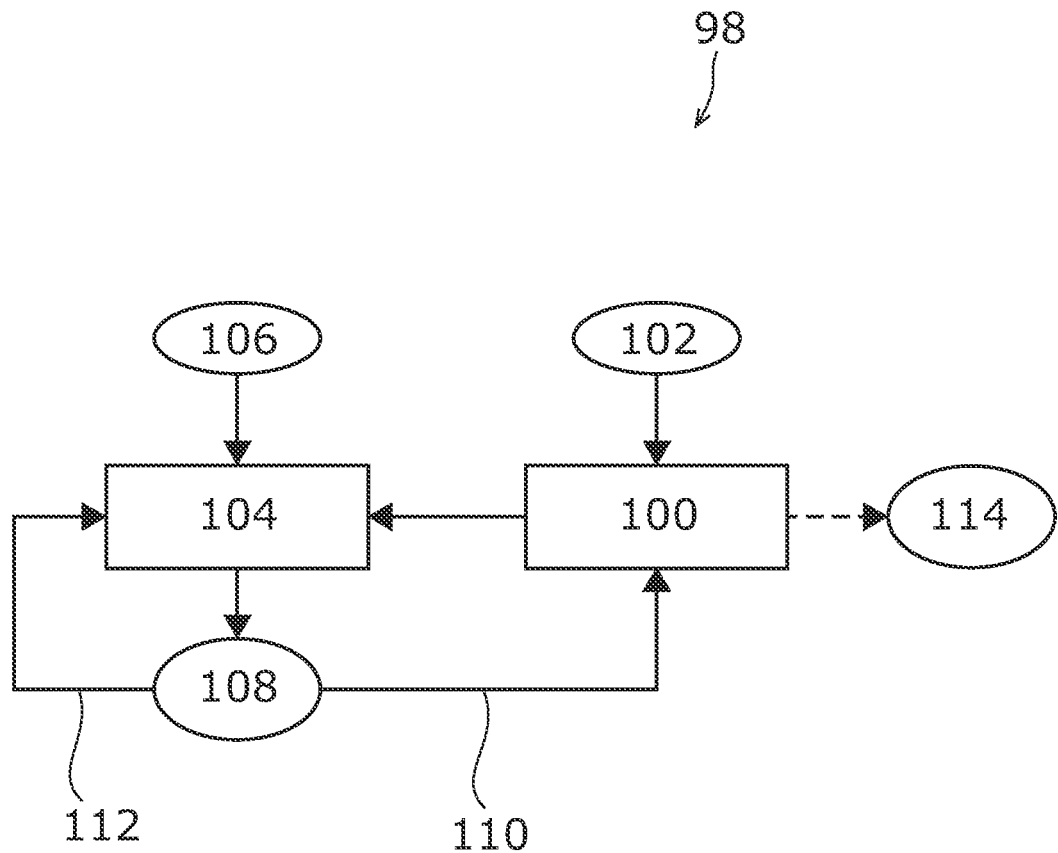
FIG. 7 is a schematic drawing of a GAN algorithm.

FIG. 7 is a schematic drawing of a GAN algorithm 98 according to an example.

The generator 100 of the GAN algorithm 98 receives a random vector 102 and generates fake images. These fake images are provided to the discriminator 104. According to this example, the discriminator 104 also receives the input image 106 acquired using at least one sensing device 12.

At step 108, the discriminator 104 classifies the received fake images and the input image 106 to be authentic or to be fake. In other words, the discriminator evaluates the authenticity of the received images. Based on the findings with regard to authenticity, the generator mapping policy is adapted upon repetitions 110 of the cycle. Optionally, also the discriminator mapping policy describing the procedures to evaluate authenticity of the received images maybe adapted upon repetitions 112.

Once a confidence level threshold is achieved or exceeded, the generator mapping policy has been sufficiently adjusted. Thereby, the training procedure may be considered to be finished. The so-adjusted generator mapping policy may be used to generate transformed output images at step 114 during "in-field" use phases of the GAN algorithm 98.

Certain embodiments disclosed herein, particularly the respective module(s) or devices, utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any suitable type can be used.

In an embodiment, circuitry such as included in the data processing device includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about", "approximately", "near" etc., mean plus or minus 5% of the stated value.

Although the disclosure has been illustrated and described with respect to one or more implementations, equivalent alterations and modifications will occur to others skilled in the art upon the reading and understanding of this specification and the annexed drawings. In addition, while a particular feature of the disclosure may have been disclosed with respect to only one of several implementations, such feature may be combined with one or more other features of the other implementations as may be desired and advantageous for any given or particular application.

The invention claimed is:

1. A method for customization of images in a vehicle, the method comprising:
   obtaining, from at least one sensing device of the vehicle, an image to be customized;
   receiving, in at least one human-machine-interface in or connected to the vehicle, an input determining at least one customization scheme to be performed;
   inputting the image and the at least one customization scheme to an artificial intelligence program executed by at least one processing device of the vehicle along with one or more current vehicle properties including a velocity of the vehicle, to generate a transformed image; and
   outputting, with at least one smart mirror of the vehicle or a mobile device connected to the at least one data processing device, the transformed image;
   wherein the at least one customization scheme includes a plurality of adaptation modes that specify respective different image configurations.

2. The method according to claim 1, wherein the plurality of adaptation modes includes at least one of a sharpness adaptation mode, a brightness adaptation mode, a weather-type adaptation mode, a portrait adaptation mode, a comic adaptation mode, and a color adaptation mode.

3. The method of claim 1, wherein the at least one data processing device comprises a plurality of generative adversarial networks, wherein at least one generative adversarial network of the plurality of generative adversarial networks is assigned to each of the plurality of adaptation modes.

4. The method according to claim 3, wherein the at least one data processing device is coupled to a server device, wherein each of the plurality of generative adversarial networks comprises at least two neural networks, and wherein the at least one data processing device receives at least one operating mapping policy comprising weights of neurons included in at least one of the two neural networks of each at least one generative adversarial network of the plurality of generative adversarial networks assigned to each of the plurality of adaptation modes.

5. The method according to claim 4, wherein the operating mapping policy is determined at least by:
   (1) providing, in a generator of a generative adversarial network in the plurality of generative adversarial networks, at least one training image;
   (2) generating, using the generator, at least one fake image associated with the at least one training image based on a generator mapping policy assigned to the generator;
   (3) providing, to a discriminator of the respective generative adversarial network, the at least one training image and the at least one fake image, wherein the generator and the discriminator comprise different neural networks; and
   (4) determining, using the discriminator, a confidence level matrix based on the at least one training image and the at least one fake image, wherein the confidence level matrix determines whether a respective image of the at least one training image and the at least one fake image is considered authentic;
   wherein the generator mapping policy is adjusted in view of individual weight levels included therein upon repetitions of steps (1)-(4) at least until the confidence level matrix comprises individual confidence levels equal to or exceeding a confidence level threshold, and wherein the at least one operating mapping policy at least includes the generator mapping policy that is adjusted.

6. The method according to claim 1, wherein the at least one human-machine-interface comprises at least one of the smart mirror of the vehicle and/or a multimedia device of the vehicle and/or a mobile device connected to the at least one data processing device of the vehicle or connected to a server device coupled to the at least one data processing device of the vehicle.

7. The method according to claim 1, wherein multiple customization schemes are determined by one or multiple inputs at the at least one human-machine-interface, and wherein the image is transformed according to the multiple customization schemes.

8. The method according to claim 1, wherein the plurality of adaptation modes further includes a device status adaptation mode, wherein the at least one smart mirror is coupled to at least one control device of the vehicle and adapted to receive controller area network data thereof, wherein the at least one smart mirror is configured to comprise device status information embedded or overlaid with the transformed image if at least the device status adaptation mode is included in the at least one customization scheme received at the at least one human-machine-interface, and wherein the device status information is based on the received controller area network data.

9. The method according to claim 1,
   wherein the plurality of adaptation modes includes a device status adaptation mode;
   wherein the at least one data processing device is coupled to at least one control device of the vehicle and adapted to receive controller area network (CAN) data thereof;
   wherein the at least one data processing device is configured to comprise device status information within the transformed image if at least the device status adaptation mode is included in the at least one customization scheme received at the at least one human-machine-interface; and
   wherein the device status information is based on the received controller area network data.

10. A system, comprising:
    at least one sensing device for a vehicle configured to obtain an image to be customized;
    at least one human-machine-interface of the vehicle or connected thereto configured to receive an input determining at least one customization scheme to be performed, wherein the at least one customization scheme includes a plurality of adaptation modes;
    at least one data processing device programmed to transform the image according to the at least one customization scheme and one or more current vehicle properties including a velocity of the vehicle, by applying artificial intelligence, into a transformed image, and to output the output image; and
    at least one smart mirror or mobile device connected to the at least one data processing device configured to receive and output the transformed image.

11. The system of claim 10, wherein the plurality of adaptation modes includes at least one of a sharpness adaptation mode, a brightness adaptation mode, a weather-type adaptation mode, a portrait adaptation mode, a comic adaptation mode, and a color adaptation mode.

12. The system of claim 10, wherein the at least one data processing device comprises a plurality of generative adversarial networks, wherein at least one generative adversarial network of the plurality of generative adversarial networks is assigned to each of the plurality of adaptation modes.

13. The system according to claim 12, wherein the at least one data processing device is coupled to a server device, wherein each of the plurality of generative adversarial networks comprises at least two neural networks, and wherein the at least one data processing device receives at least one operating mapping policy comprising weights of neurons included in at least one of the two neural networks of each at least one generative adversarial network of the plurality of generative adversarial networks assigned to each of the plurality of adaptation modes.

14. The system according to claim 13, wherein the operating mapping policy is determined at least by:
  (1) providing, in a generator of a generative adversarial network in the plurality of generative adversarial networks, at least one training image;
  (2) generating, using the generator, at least one fake image associated with the at least one training image based on a generator mapping policy assigned to the generator;
  (3) providing, to a discriminator of the respective generative adversarial network, the at least one training image and the at least one fake image, wherein the generator and the discriminator comprise different neural networks; and
  (4) determining, using the discriminator, a confidence level matrix based on the at least one training image and the at least one fake image, wherein the confidence level matrix determines whether a respective image of the at least one training image and the at least one fake image is considered authentic;
  wherein the generator mapping policy is adjusted in view of individual weight levels included therein upon repetitions of steps (1)-(4) at least until the confidence level matrix comprises individual confidence levels equal to or exceeding a confidence level threshold, and wherein the at least one operating mapping policy at least includes the generator mapping policy that is adjusted.

15. The system according to claim 10, wherein the at least one sensing device comprises at least one of a visual spectrum camera, a depth camera, an infrared camera, a stereo camera, and a light detection and ranging device.

16. The system according to claim 10, wherein the at least one human-machine-interface comprises at least one of the at least one smart mirror and/or a multimedia device of the vehicle and/or a mobile device connected to the at least one data processing device of the vehicle or connected to a server device coupled to the at least one data processing device of the vehicle.

17. The system according to claim 10, wherein the at least one smart mirror of the vehicle has at least one display and comprises at least one of a multimedia device of the vehicle, a digital sunroof of the vehicle, and a mobile device connected to the at least one data processing device of the vehicle or connected to a server device coupled to the at least one data processing device of the vehicle.

18. The system according to claim 10, wherein multiple customization schemes are determined by one or multiple inputs at the at least one human-machine-interface, and wherein the image is transformed according to the multiple customization schemes.

19. The system according to claim 10, wherein the plurality of adaptation modes also includes a device status adaptation mode, wherein the at least one smart mirror is coupled to at least one control device of the vehicle and adapted to receive controller area network data thereof, wherein the at least one smart mirror is configured to comprise device status information embedded or overlaid with the transformed image if at least the device status adaptation mode is included in the at least one customization scheme received at the at least one human-machine-interface, and wherein the device status information is based on the received controller area network data.

20. The system according to claim 10,
  wherein the plurality of adaptation modes includes a device status adaptation mode;
    wherein the at least one data processing device is coupled to at least one control device of the vehicle and adapted to receive controller area network (CAN) data thereof;
    wherein the at least one data processing device is configured to comprise device status information within the transformed image if at least the device status adaptation mode is included in the at least one customization scheme received at the at least one human-machine-interface; and
    wherein the device status information is based on the received controller area network data.

* * * * *